US006282770B1

(12) United States Patent
Lyon

(10) Patent No.: US 6,282,770 B1
(45) **Date of Patent: *Sep. 4, 2001**

(54) SLIDING DOOR HARDWARE ASSEMBLY AND METHOD

(76) Inventor: John E. Lyon, 1535 Squire Davis Rd., Kernersville, NC (US) 27284

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/328,989

(22) Filed: Jun. 9, 1999

(51) Int. Cl.7 .............................. B23P 11/00; A47B 97/00
(52) U.S. Cl. .............................................. 29/434; 312/322
(58) Field of Search ............................... 29/434; 312/7.2, 312/322, 110, 323, 326, 327, 329

(56) References Cited

U.S. PATENT DOCUMENTS 4,729,612 * 3/1988 Stone ............................... 312/322 X
4,852,212 * 8/1989 Amann .................................. 16/102
4,910,916 * 3/1990 Dubach et al. ......................... 49/257
4,945,972 * 8/1990 Takeuchi .......................... 312/322 X
4,974,912 * 12/1990 Rask et al. ....................... 312/322 X
5,108,165 * 4/1992 Rorke et al. ......................... 312/322
5,169,221 * 12/1992 Wheeler ............................... 312/323
5,395,165 * 3/1995 Woerner ............................... 312/110
5,974,667 * 11/1999 Bryson ............................... 29/434 X

* cited by examiner

*Primary Examiner*—Peter M. Cuomo
*Assistant Examiner*—James O. Hansen

(57) ABSTRACT

A hardware assembly is provided for cabinet sliding doors as are used with entertainment centers. The hardware assembly includes a u-shaped spacer which is attached to a slotted plate in selective fashion to provide infinite relative positioning. The hardware assembly can be quickly installed and adjusted by inexperienced personnel which is useful in finishing the cabinet and thereafter, daily usage.

6 Claims, 8 Drawing Sheets

SLIDING DOOR HARDWARE ASSEMBLY AND METHOD

BACKGROUND OF THE INVENTION

1. Field of the Invention

The invention herein pertains to hardware for sliding doors and particularly for large doors as are used with entertainment centers.

2. Description of the Prior Art and Objectives of the Invention

In recent years entertainment centers have become popular furniture items for homes, motels, hotels and offices. Entertainment centers are generally large cabinets made of wood or similar materials which will house stereos, cd players, television sets, VCR's and other entertainment equipment. It is important that the entertainment center be closable when not in use yet when opened the doors need to not only fold but retract into the cabinet due to their large size. As a result, folding and sliding door hardware has been used for many years. However, many cabinets have front moldings which extend to reduce the frontal opening. This has required the hardware installers to use wooden blocks or other materials to offset the fixed tracks to accommodate the door to thereby allow it to bypass or clear the front molding. Other installers have used blocks of wood mounted to the track arm to provide sufficient space between the rails and door hinge to allow the door to clear the molding as the door is extended from the cabinet. These wooden blocks or supports are often unsatisfactory since they may split or be of non-uniform dimensions, causing installation, operation and maintenance problems with the sliding doors.

In addition, as entertainment centers are generally finished with either paint or varnish, the inside edges of the doors proximate the cabinet sides are difficult to finish once the cabinet has been assembled and placed in a home or office. While the door edges can be finished by removing the doors, this is of great inconvenience as oftentimes the cabinet finishers are not skilled at adjusting the doors whereby the users are left with cabinet doors which do not properly function.

In order to overcome these and other problems associated with conventional sliding door cabinet hardware, the present invention was conceived and one of its objectives is to provide cabinet door hardware which is both easy to install and which provides a superior functioning cabinet door.

It is yet another object of the present invention to provide a sliding door hardware assembly and method which can be easily used by inexperienced installers in minimum time.

It is still another objective of the present invention to provide sliding door hardware including a slotted plate which allows a cabinet finisher to quickly, temporarily adjust the door so that all edges are exposed external of the cabinet, without the necessity of totally removing the doors from the cabinet, and then, easily readjusting the door to its normal operational position.

It is a further objective of the present invention to provide metal unshaped spacers and slotted plates which can be uniformly produced and easily adapted to conventional sliding door hardware which will replace wooden fill strips.

Various other objectives and advantages will become apparent to those skilled in the art as a more detailed description is set forth below.

SUMMARY OF THE INVENTION

The aforesaid and other objectives are realized by providing a preferred cabinet sliding door hardware assembly consisting of conventional sidewall mounted tracks having a track arm extending therebetween. Attached to the track arms at each end thereof is a u-shaped spacer. Affixed to the spacer in an adjustable fashion is a planar slotted plate. Attached to the plate is a conventional sliding door hinge for a cabinet door. The slotted plate allows a threaded member to be tightened therein in one of a plurality of apertures defined by the u-shaped spacer while the slotted plate allows the door to extend totally beyond the front of the cabinet for painting or the like, and then to be returned to its normal operational position.

The preferred method of using the hardware assembly consists of attaching parallel tracks to an interior cabinet wall such as the interior cabinet wall of an entertainment center. A track arm is positioned or slidably mounted within the pair of parallel tracks and affixed thereto is a u-shaped spacer at each end which is sized to allow the door to clear the front cabinet molding. A planar slotted plate is then affixed by screws to each u-shaped spacer in a selected position which can be varied according to the particular aperture in the u-shaped member chosen. Thereafter a typical hinge for the sliding door is attached to each slotted plate with the door. The sliding door can then be moved along the tracks as needed. Temporary adjustments can be made to the position of the planar slotted member relative to the u-shaped spacer, for example such as when finishing the interior edges of the doors.

DETAILED DESCRIPTION OF THE PREFERRED EMBODIMENT AND OPERATION OF THE INVENTION

Figure 1:
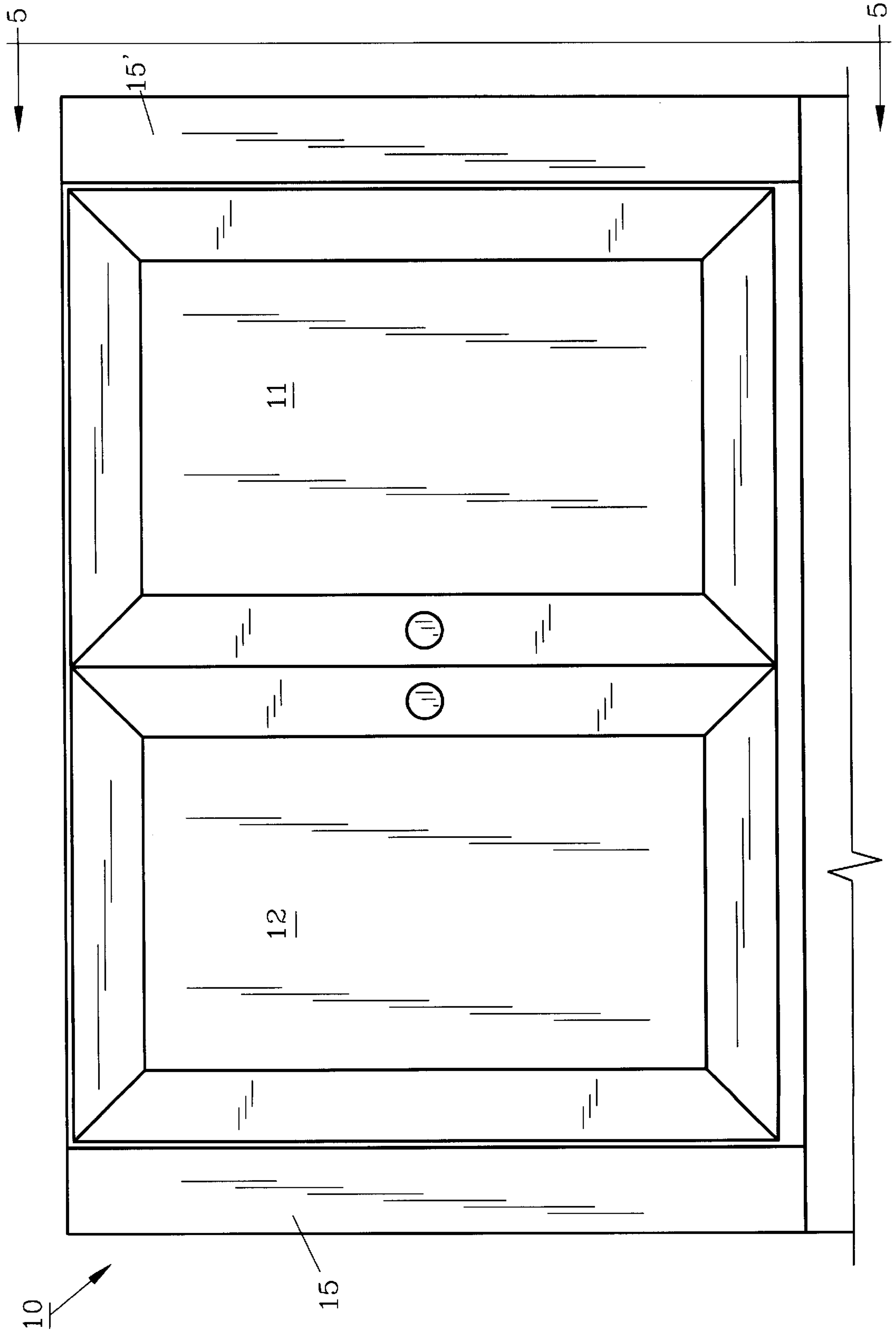
FIG. 1 shows a partial front elevational view of an entertainment center with the cabinet doors in a closed position.
Figure 2:
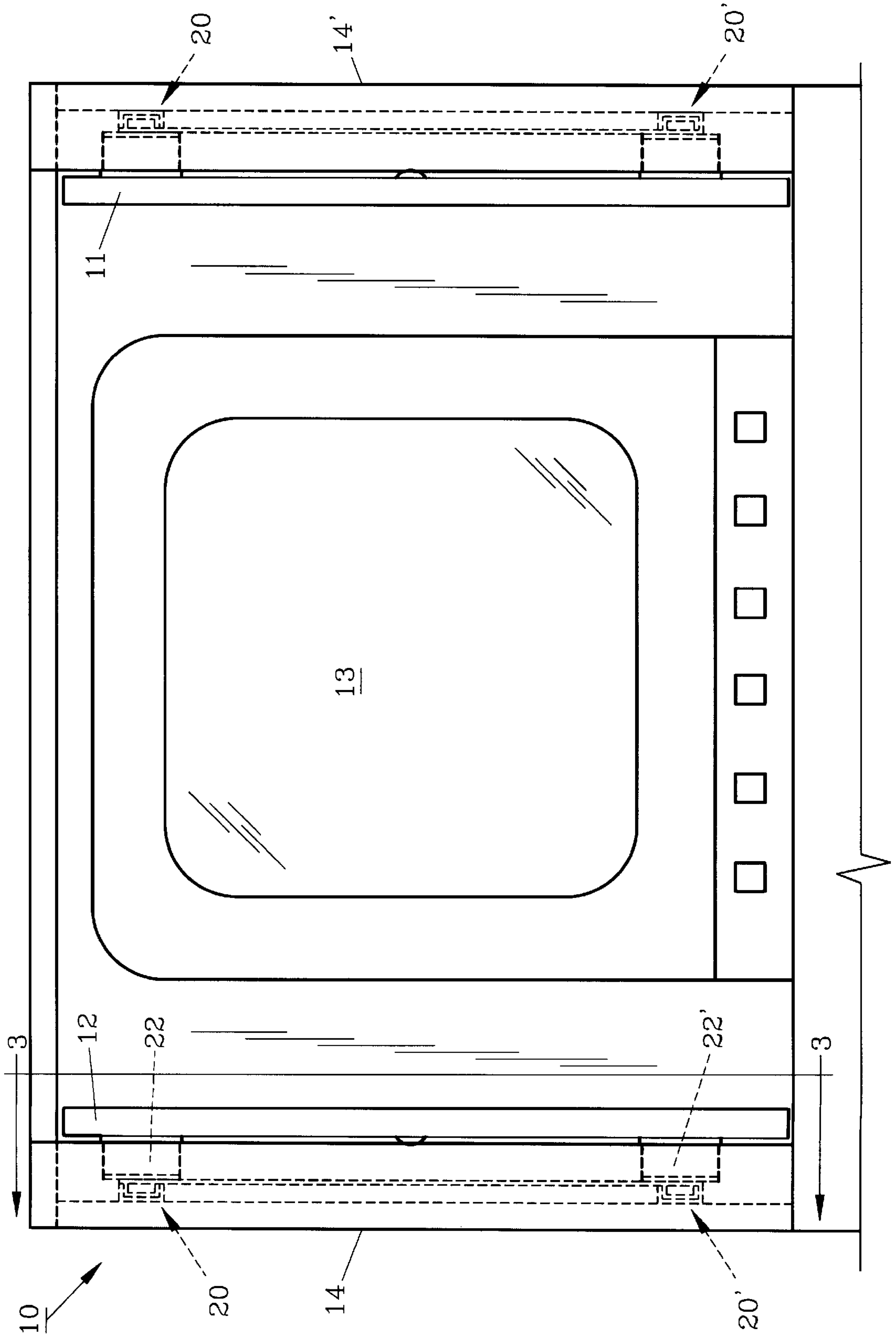
FIG. 2 demonstrates the entertainment center as shown in FIG. 1 but with the doors open and folded inside the cabinet.

For a better understanding of the invention and its method of use, turning now to the drawings, FIG. 1 demonstrates a partial front elevational view of typical entertainment cabinet 10 with doors 11, 12 closed. Cabinet 10 may be freestanding or may be built into bookshelves or the like. FIG. 2 illustrates cabinet 10 with doors 11, 12 open and withdrawn into cabinet 10 for viewing of television receiver 13. Thus, cabinet doors 11, 12 are opened and slidably positioned within cabinet 10 for convenience and aesthetic purposes. Molding 15, 15' extends along the front of cabinet 10 inwardly from cabinet sidewalls 14, 14' respectively and may be plain or decorative, depending on the specific cabinet design as also seen in FIG. 2.

Figure 3:
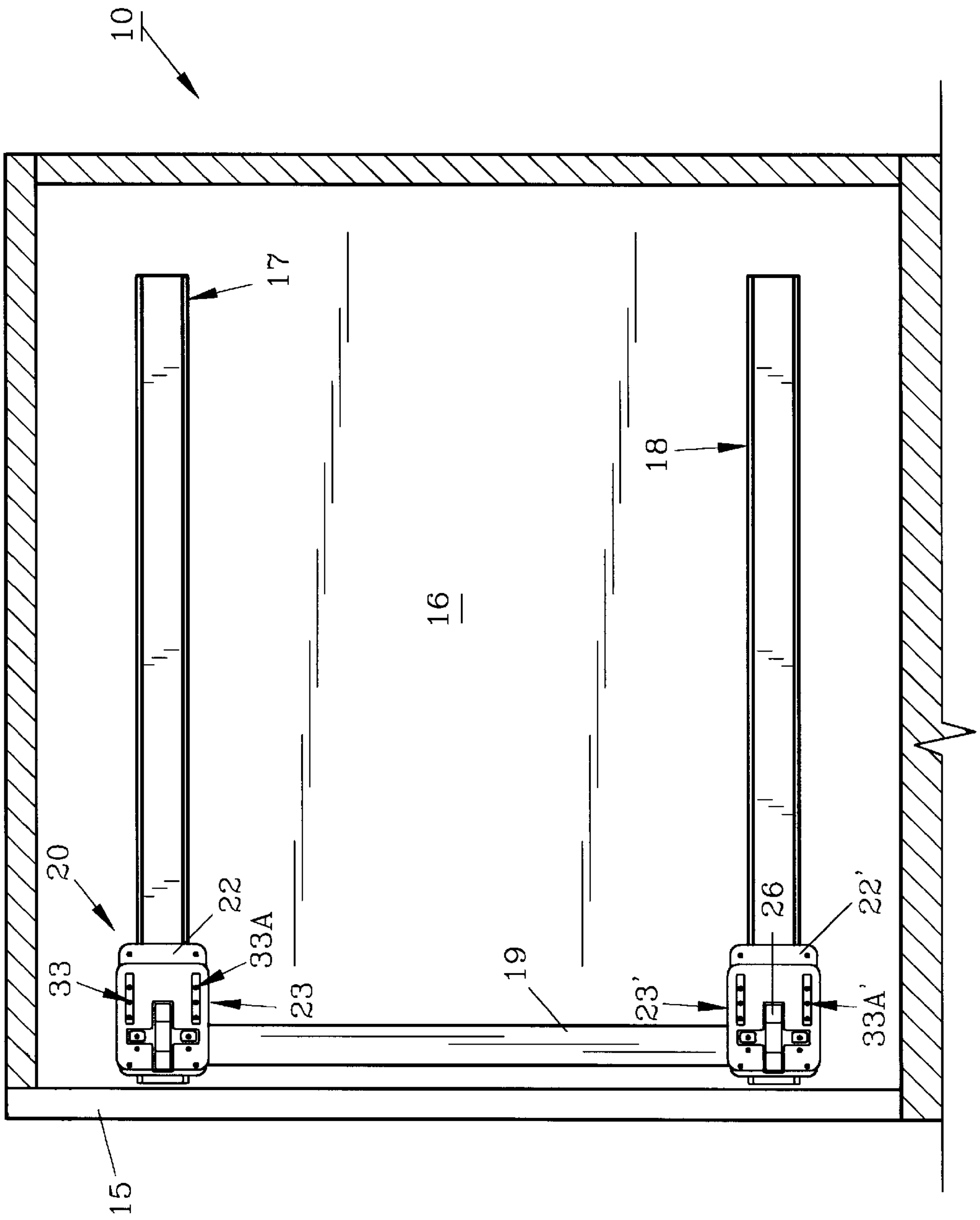
FIG. 3 illustrates an interior cross-sectional view of the inside of the cabinet along lines 3—3 as shown in FIG. 2 with the door removed to expose the door hardware.
Figure 4:
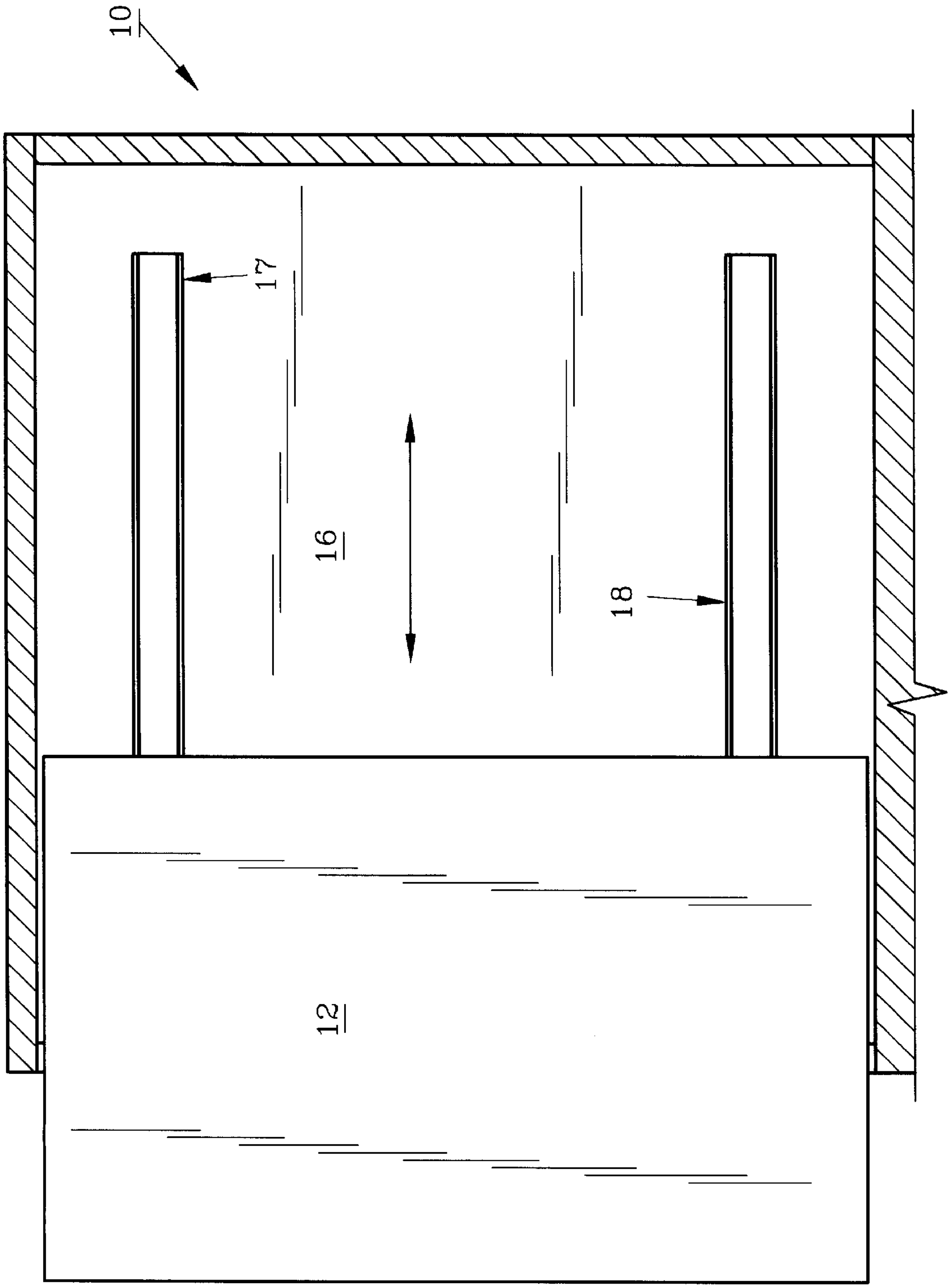
FIG. 4 depicts the cabinet in cross-sectional view as shown in FIG. 3 but with the door attached and partially withdrawn from the cabinet.
Figure 9:
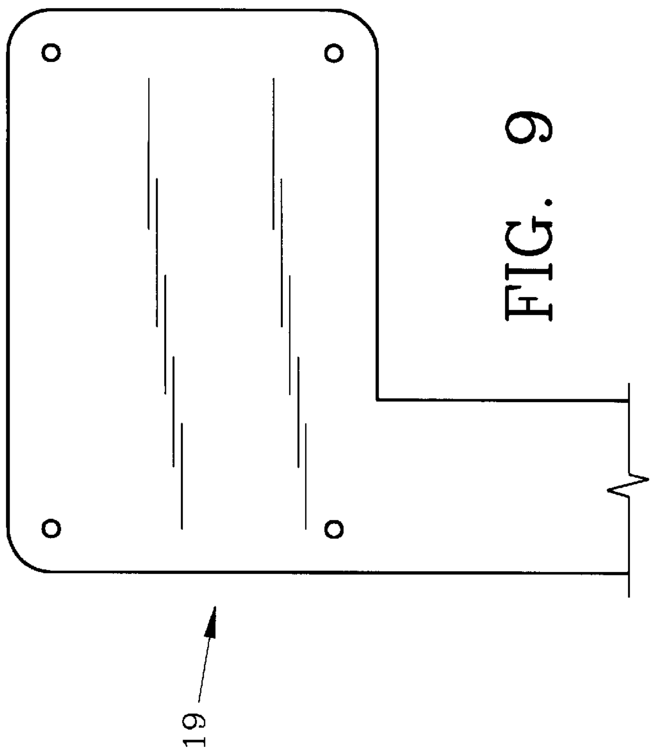
FIG. 9 depicts a fragmented view of the top of a conventional track arm.

FIG. 3 is taken generally along lines 3—3 as shown in FIG. 2 but with door 12 removed therefrom. As seen, preferred sliding door hardware assembly 20 with tracks 17, 18 are mounted to cabinet sidewall 14 as is conventional and are connected by track arm 19, also conventional for slidable movement therealong. Attached atop track arm 19 as illustrated in FIG. 9 is u-shaped spacer 22 (seen enlarged in FIGS. 6 and 7). Identical u-shaped spacers 22, 22' as shown in FIG. 2 cause door 12 to be inwardly positioned or spaced to avoid molding 15 as door 12 is withdrawn from cabinet 10 for closing. While only one door and hardware assembly are generally described herein, it being understood that opposite cabinet door 11 would attach in mirror fashion into opposite cabinet sidewall 14'. FIG. 4 likewise shows an interior view of cabinet 10 with left cabinet door 12 attached and partially withdrawn parallel to tracks 17, 18.

Figure 5:
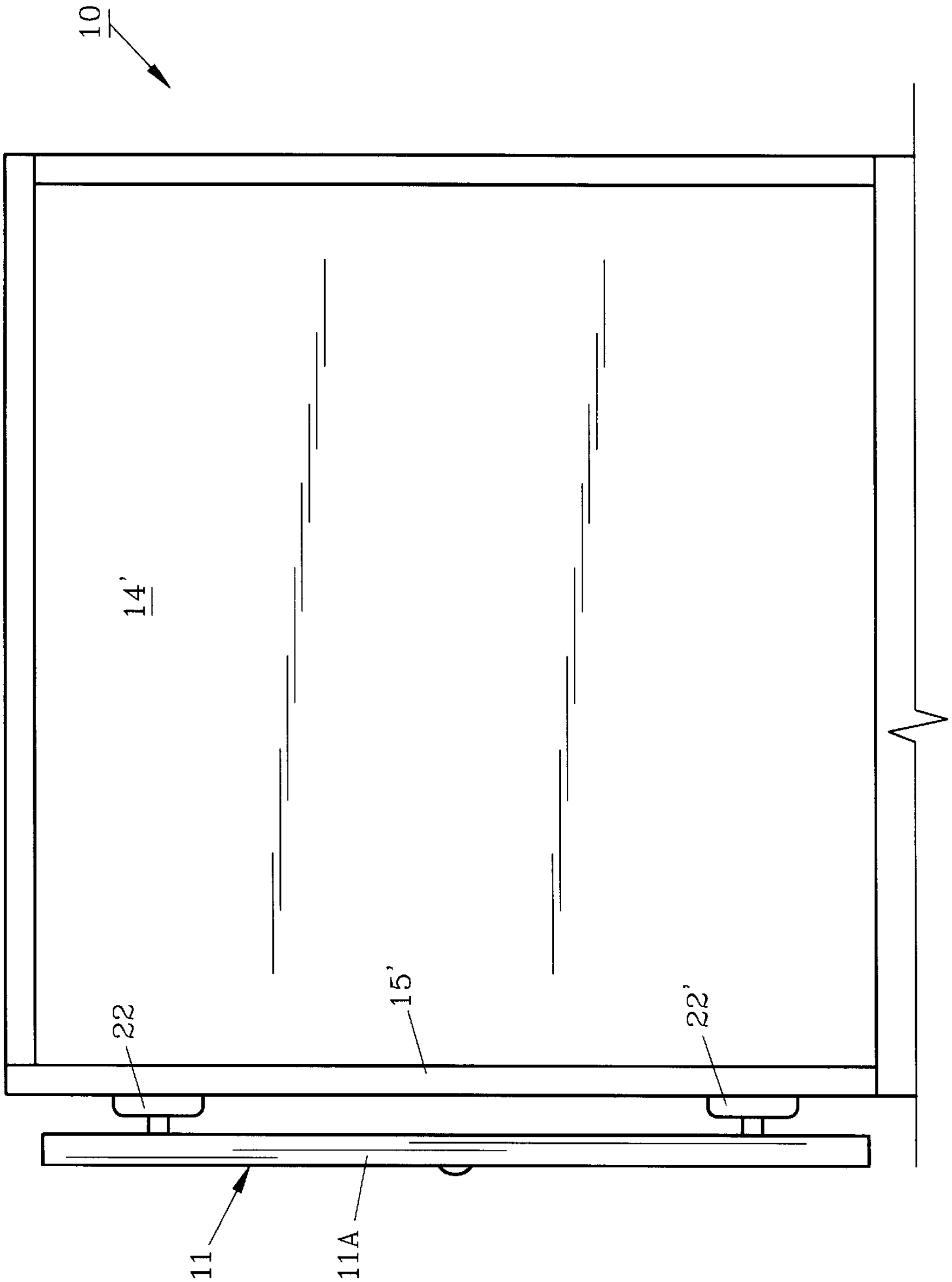
FIG. 5 demonstrates a side elevational view of the exterior of the cabinet along lines 5—5 as shown in FIG. 1 with the door extending beyond the front of the cabinet as for finishing purposes.

In FIG. 5, a result of sliding door hardware assembly 20 as shown in FIG. 2 is seen. In FIG. 5, door 11 is in a closed position i.e., perpendicular to cabinet sidewall 14' but is spaced approximately one inch (2.54 cm) therefrom. This spacing allows access, for example by a cabinet finisher to apply a paint, varnish or other coating to door edge 11A by positioning door 11 as shown in FIG. 5. Once door edge 11A is finished, adjustments can be made to spacer 22 and planar plate 23 as hereinafter described to return door 11 to a flush position as in a normal operational closing within cabinet 10 such as shown in FIG. 1.

Figure 11:
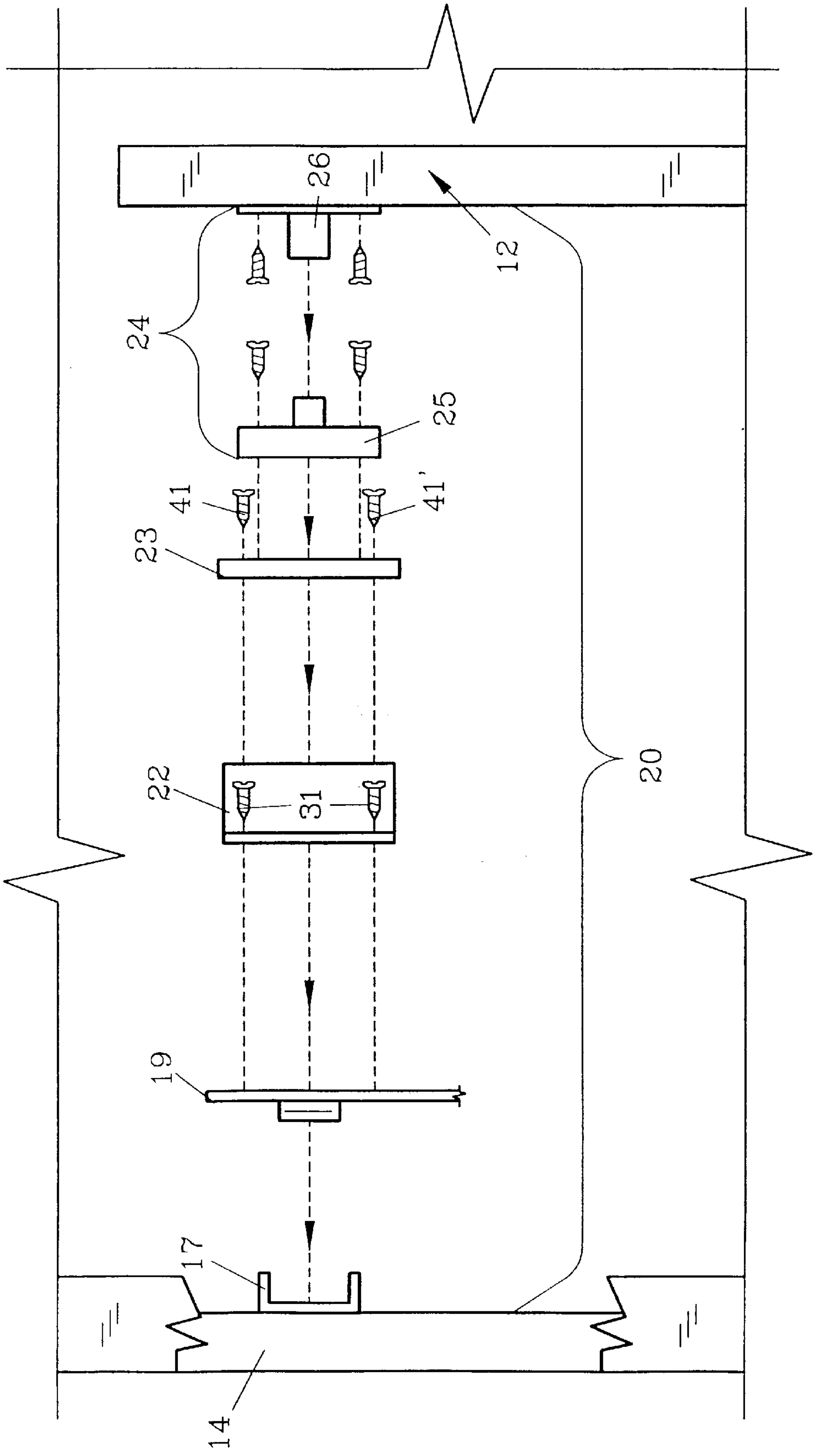
FIG. 11 demonstrates sliding door hardware assembly of the invention in a schematic exploded fashion.

As featured in the exploded view in FIG. 11, door hardware assembly 20 includes track 17, track arm 19 (shown fragmented), u-shaped bracket 22, slotted planar plate 23 and door hinge 24 consisting of hinge components 25 and 26. Parts 17, 19 and 24 are conventional and have been used in the cabinet industry for many years.

Figure 7:
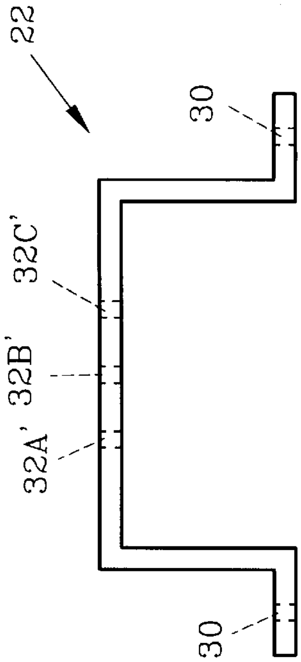
FIG. 7 provides a front elevational view of the u-shaped spacer as shown in FIG. 6.
Figure 6:
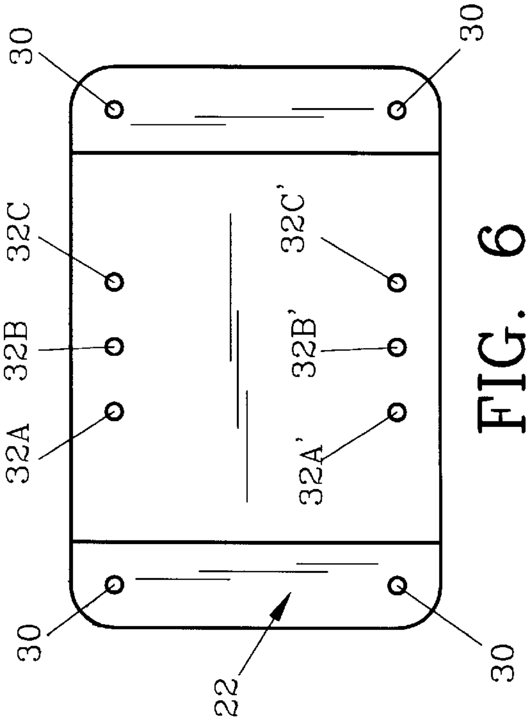
FIG. 6 features an enlarged top view of the u-shaped spacer of the invention.
Figure 8:
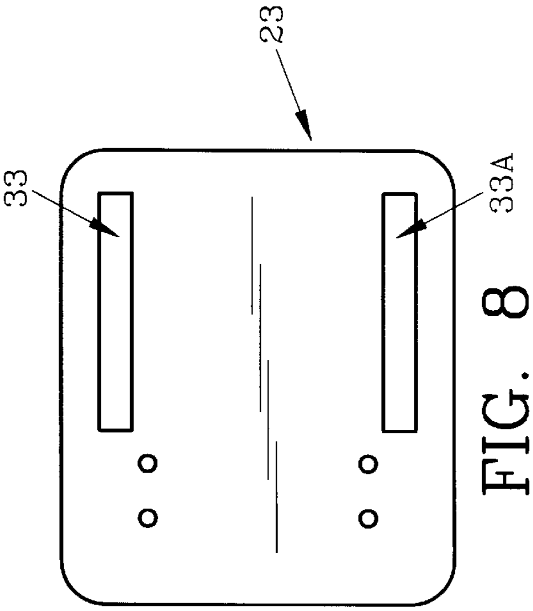
FIG. 8 pictures a top plan view of the planar slotted plate of the invention.
Figure 10:
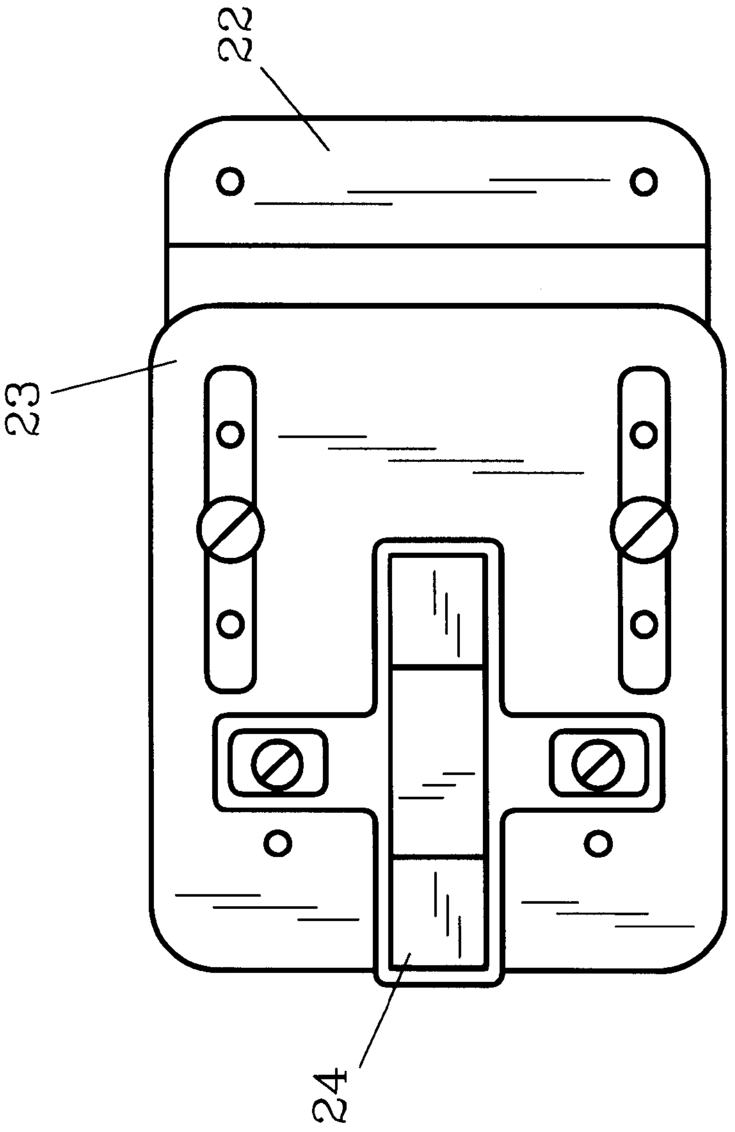
FIG. 10 illustrates a top plan view of the u-shaped spacer with the slotted plate selectively affixed thereto.

In FIG. 6, a top view of u-shaped spacer 22 is shown having mounting apertures 30 for receiving screws 31 (FIG. 11) or other fasteners therein for attaching u-shaped spacer 22 to track arm 19. Apertures 32A, 32B, 32C and apertures 32A', 32B' and 32C' as shown in FIGS. 6 and 7 are coincidentally aligned within slots 33, 33A respectively of planar plate 23. Thus by selecting aperture 32A, 32B or 32C and corresponding apertures 32A', 32B' or 32C', an adjustment can be made between u-shaped spacer 22 and planar plate 23. This adjustment thus provides a relative position of planar plate 23 and u-shaped spacer 22, for example to allow door 11 as shown in FIG. 5 to extend beyond cabinet molding 15' as shown in FIG. 5. Likewise, when doors 11 and 12 have been completely finished including edges 11A, 12A (not shown) spacer 22 can be moved by loosening threaded members 41, 41' as shown in FIG. 11 as desired so doors 11, 12 will close flush with the front of cabinet 10 and can be slid completely within cabinet 10. Thus, slots 33, 33A of plate 23 (shown enlarged in FIG. 8) and apertures 32A–32C of u-shaped spacer 22 provide an infinite variety of positions of u-shaped spacer 22 relative to planar plate 23, such as described above and as seen in enlarged fashion in FIG. 10.

The preferred method of mounting a door to a cabinet such as cabinet 10 as seen in FIG. 1 comprises attaching a conventional track such as track 17, 18 as shown in FIG. 3 to sidewall 16 of cabinet 10. Next, track arm 19 (shown enlarged in FIG. 9) is positioned in track 17, 18 and u-shaped spacers 22, 22' are affixed at opposite ends of track, arm 19 with apertures provided. Next, planar plates 23, 23' are attached respectively to u-shaped spacers 22, 22' at selected positions as apertures 32A–32C and 32A'–32C' are aligned with slots 33, 33A, 33', 33A' of planar plates 23, 23' respectively. Conventional sliding hinges such as hinges 24 are then joined to a sliding door such as door 12 for movement along tracks 17 and 18 as u-shaped spacers 22, 22' allow door 12 to bypass front cabinet molding 15 as door 12 is opened and closed whereas planar plates 23, 23' provides infinite adjustments between u-shaped spacers 22, 22' and slotted planar plates 23, 23' respectively.

The illustrations and examples provided herein are for explanatory purposes and are not intended to limit the scope of the appended claims.

I claim:

1. A method of mounting a slidable door having a front and a rear edge inside a cabinet comprising the steps of:

(a) attaching a track inside a cabinet wall;

(b) affixing a track arm to said track for movement therealong;

(c) affixing a u-shaped spacer to the track arm completely inwardly thereof;

(d) selectively affixing a slotted plate to said u-shaped spacer inwardly thereof;

(e) attaching a hinge member to said slotted plate inwardly thereof;

(f) attaching a door to the hinge member; and (g) adjusting the relative position of said u-shaped spacer to said slotted plate, to allow said door to extend beyond said cabinet wall for exposure of the rear door edge.

2. The method of claim 1 further comprising the step of subsequently adjusting the relative position of said slotted plate to prevent exposure of said rear door edge beyond said cabinet wall.

3. A method of mounting a slidable door having a front and a rear edge inside a cabinet having a front opening and a molding along a side on the front of the cabinet which projects inwardly, towards the center of the cabinet to narrow the front opening, comprising the steps of:

(a) attaching a track inside the side cabinet wall;

(b) affixing a track arm to said track for movement therealong;

(c) affixing the top of a u-shaped spacer to the track arm so the u-shaped spacer is completely inwardly of the track arm;

(d) selectively affixing a slotted plate to the bottom of said u-shaped spacer;

(e) attaching a hinge member to said slotted plate inwardly thereof; and (f) attaching a door to the hinge member so said door can move along said track while said u-shaped spacer prevents said door from contacting the front molding.

4. The method of claim 3 further comprising the step of adjusting the relative position of said u-shaped spacer to said slotted plate.

5. The method of claim 4 wherein adjusting the relative position of the u-shaped spacer comprises the step of adjusting the relative position of said slotted plate to allow said door to extend beyond said cabinet wall for exposure of the rear door edge.

6. The method of claim 5 further comprising the step of subsequently adjusting the relative position of said slotted plate to prevent exposure of said rear door edge beyond said cabinet wall.

* * * * *